Jan. 8, 1946. B. R. HARRIS 2,392,666
FILTERING OF LIQUID MATERIAL
Filed Aug. 21, 1941 7 Sheets-Sheet 5
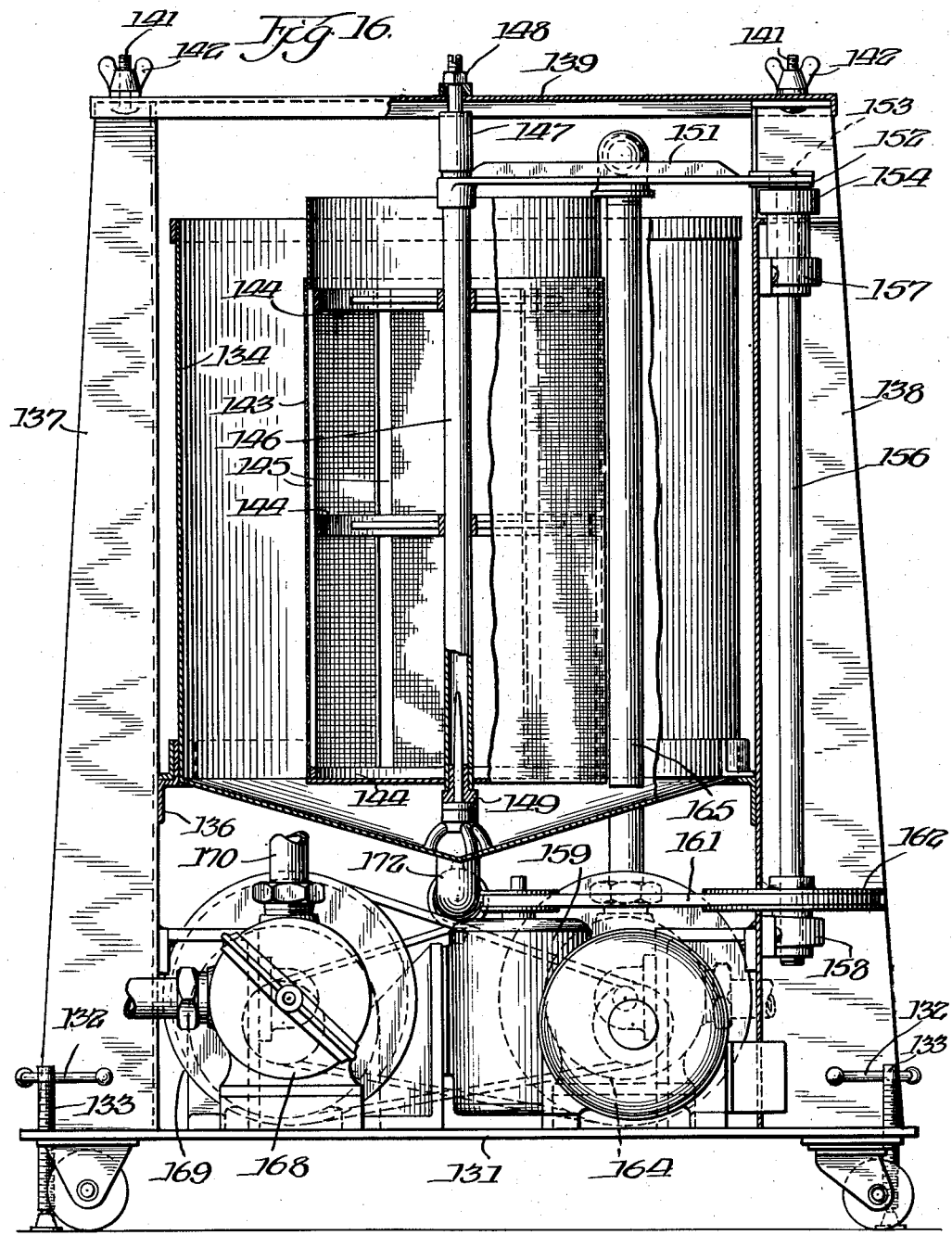

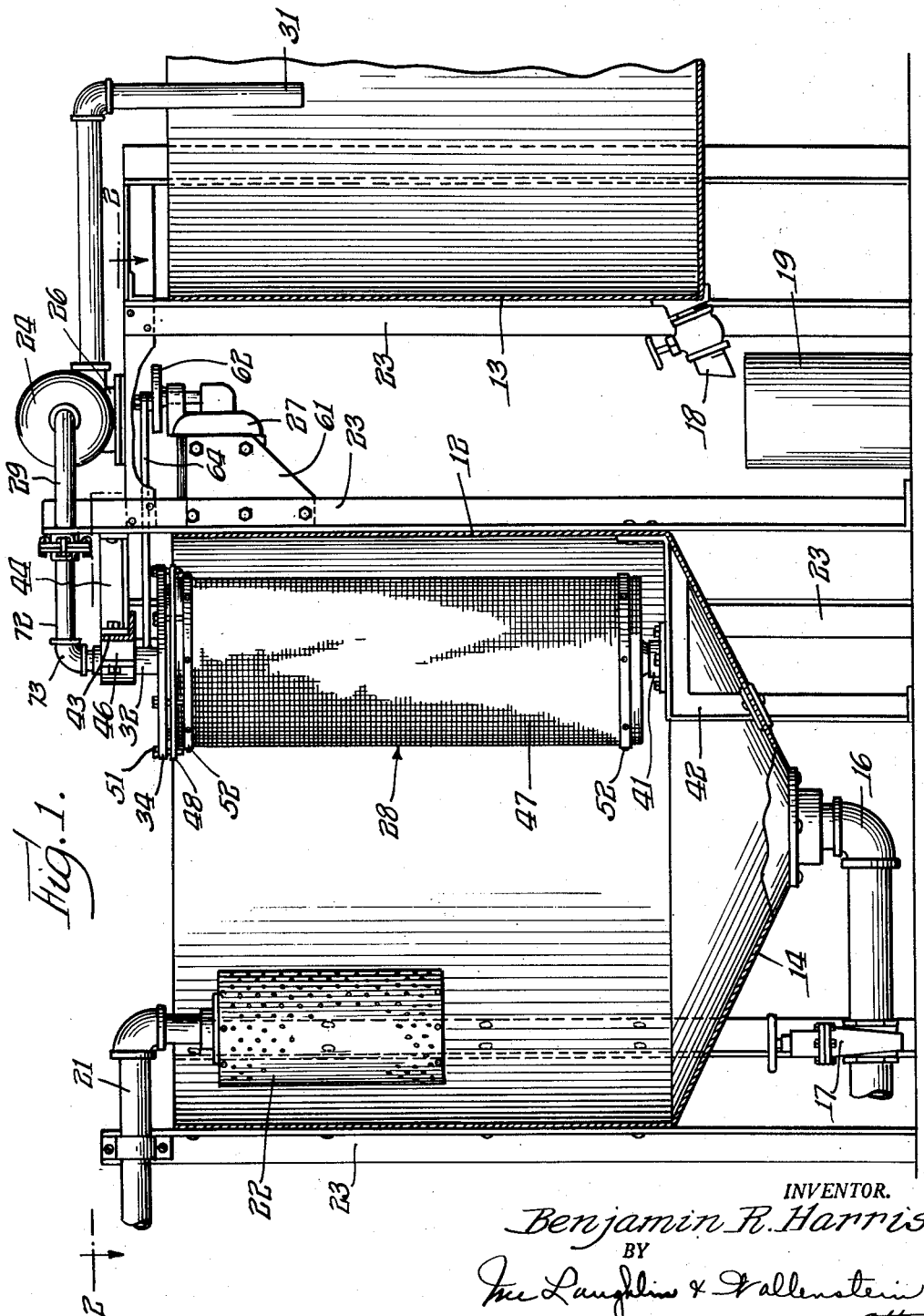

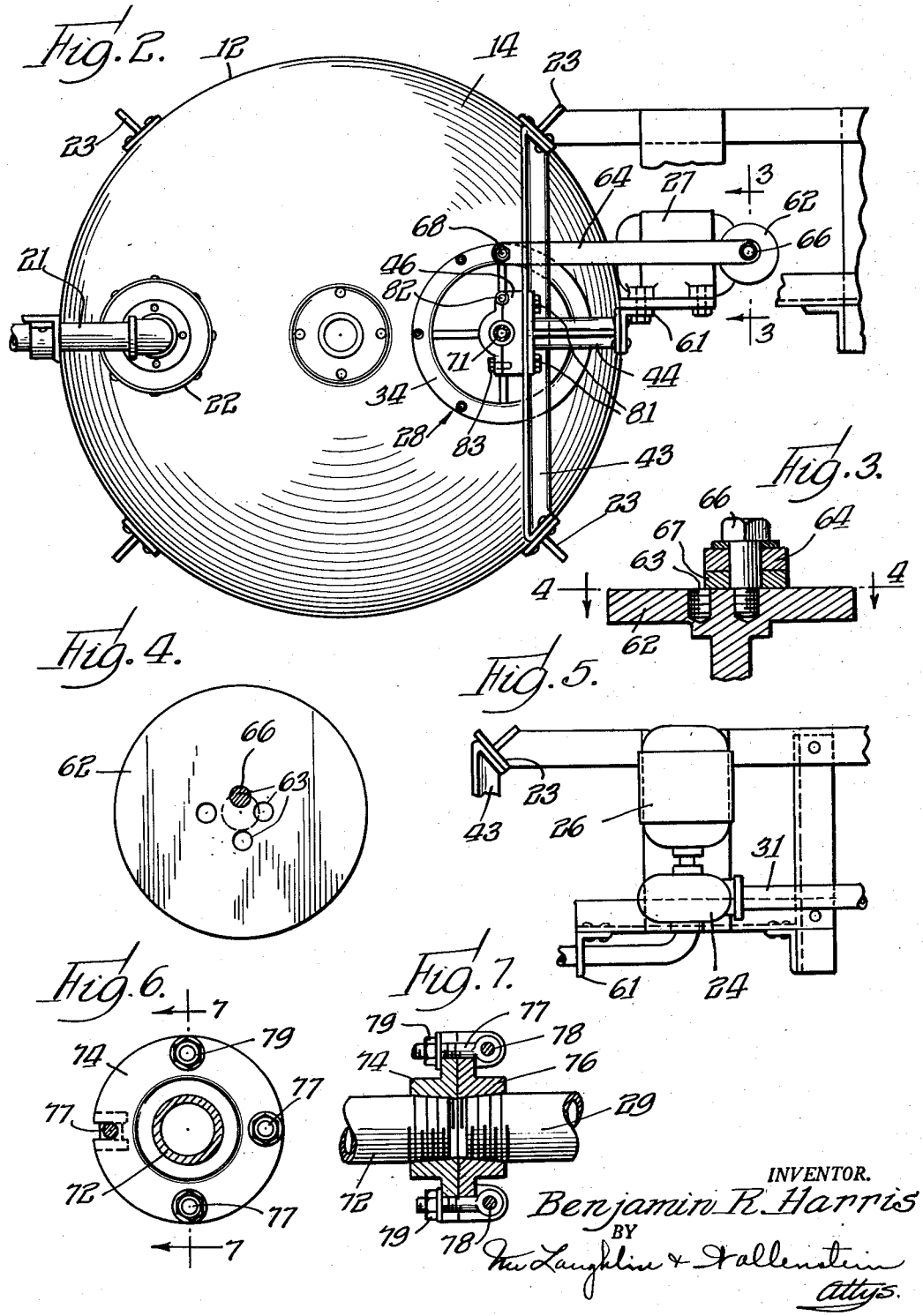

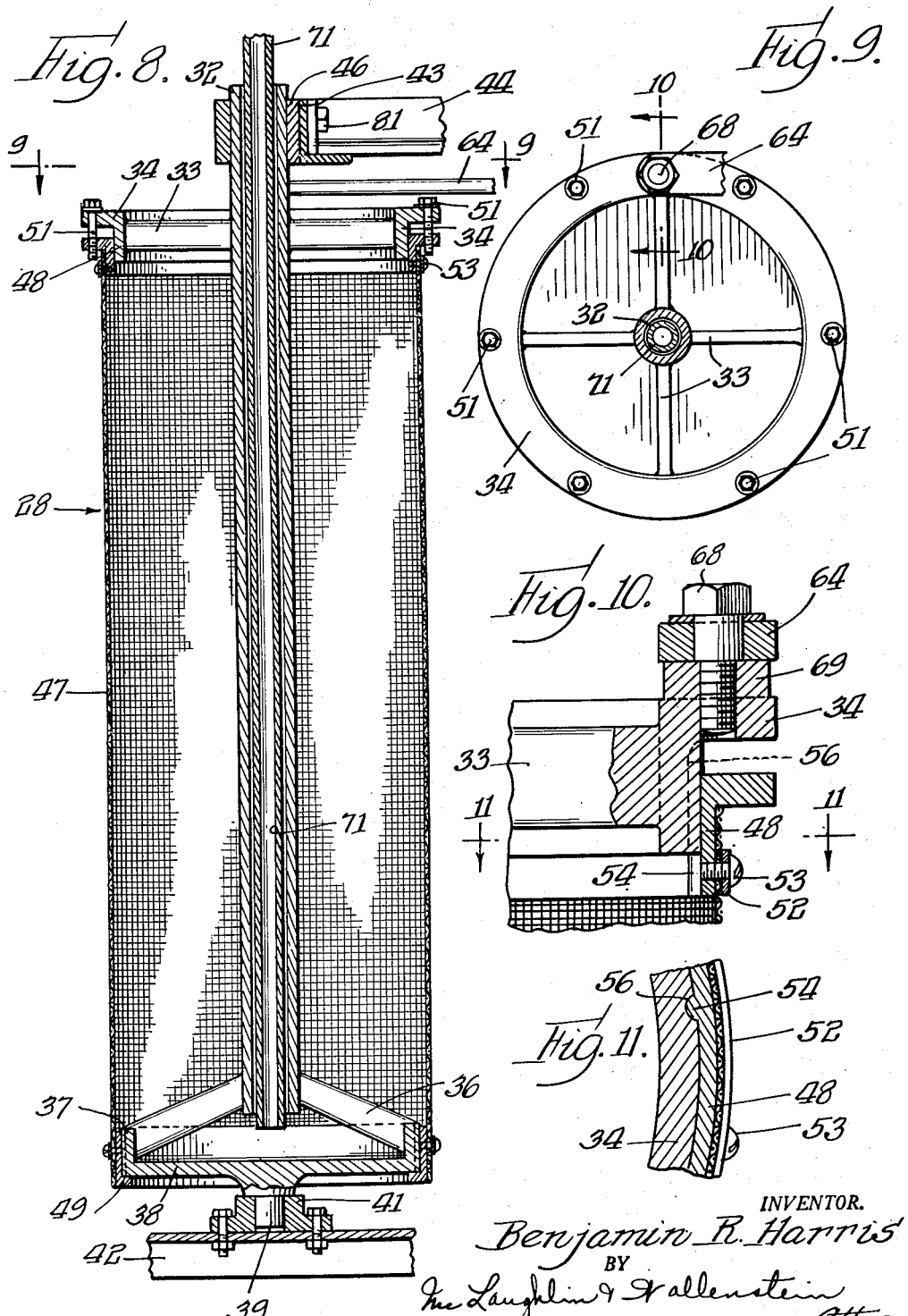

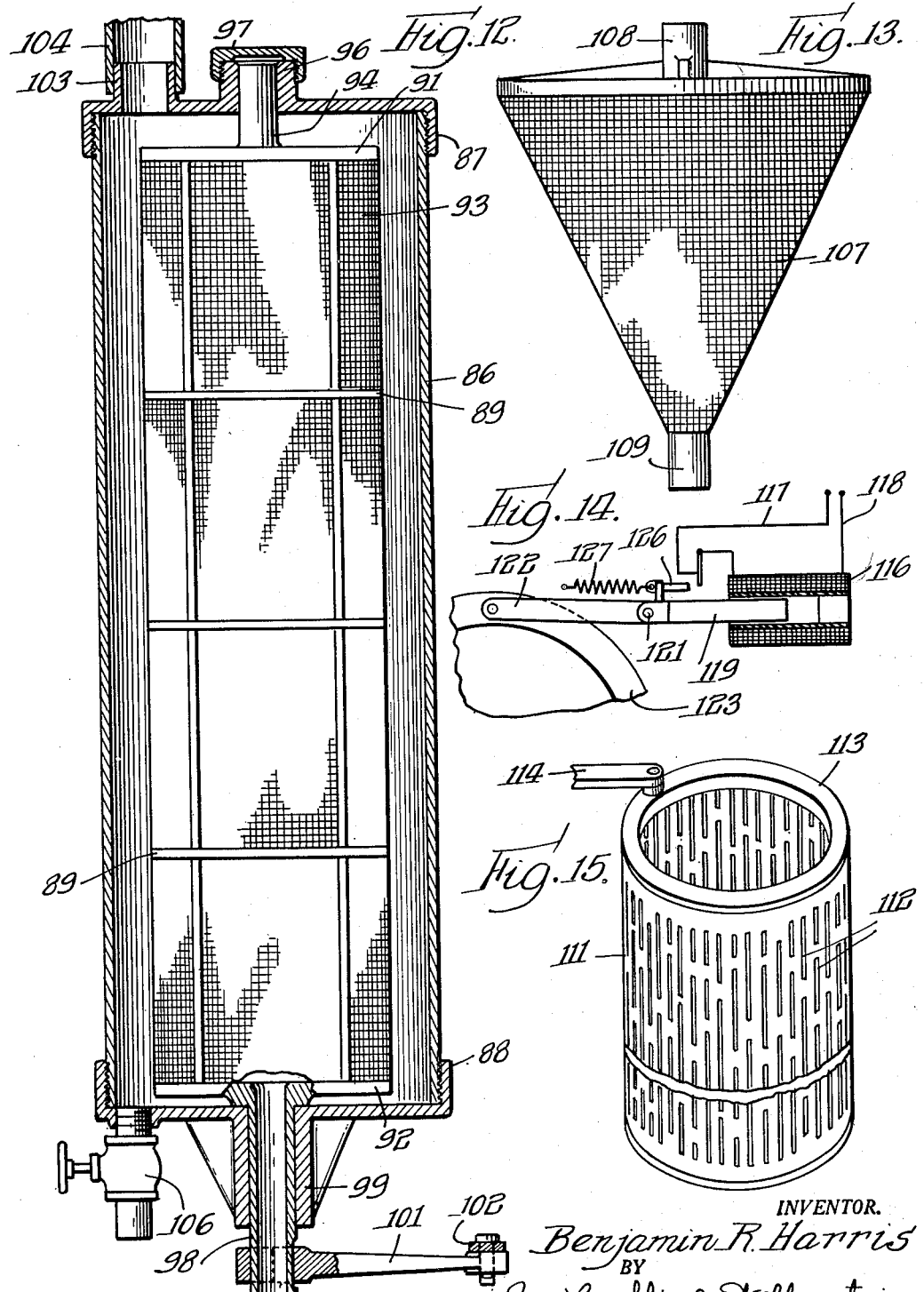

Jan. 8, 1946.　　　B. R. HARRIS　　　2,392,666
FILTERING OF LIQUID MATERIAL
Filed Aug. 21, 1941　　7 Sheets-Sheet 6
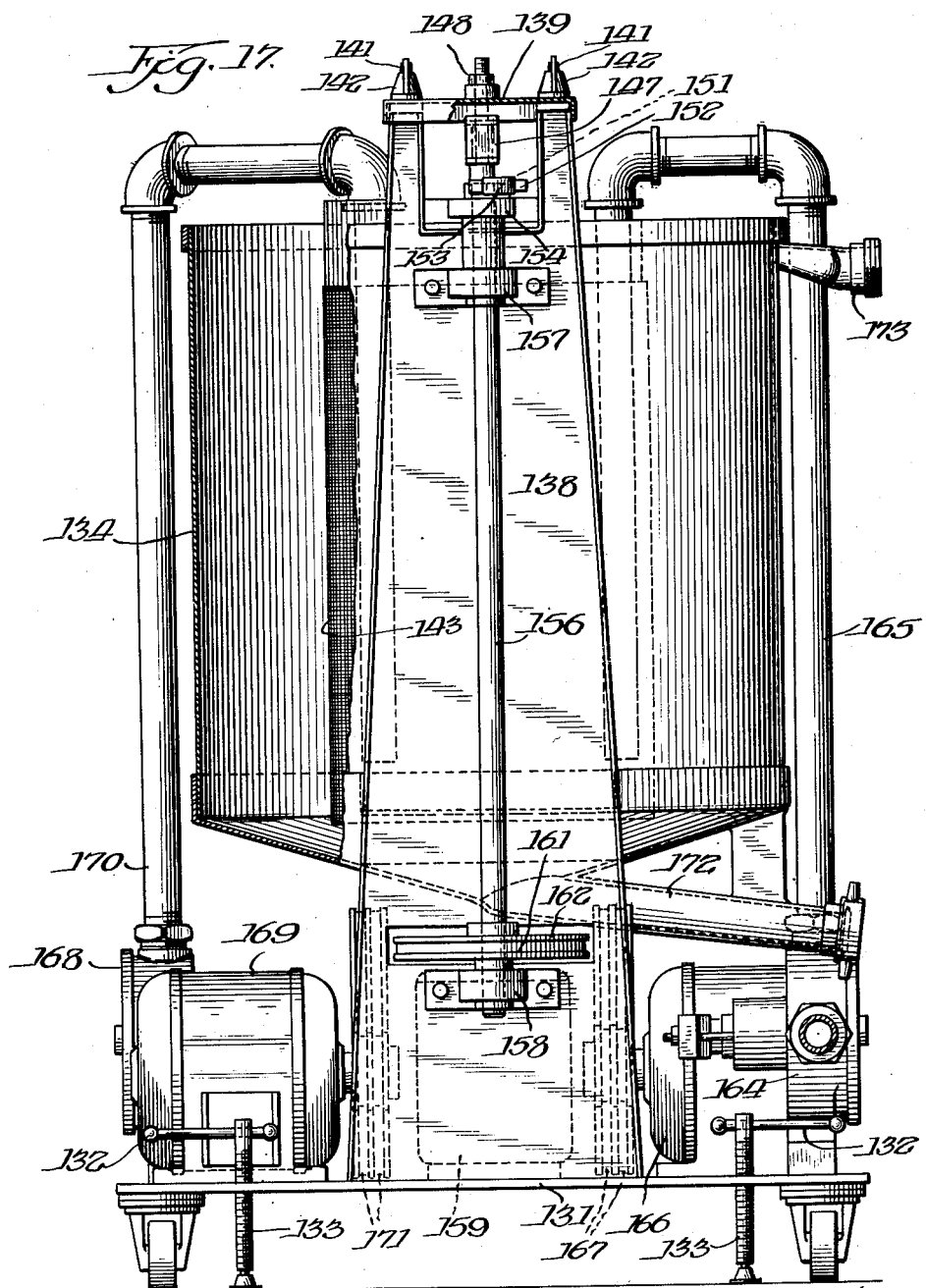

Jan. 8, 1946.    B. R. HARRIS    2,392,666
FILTERING OF LIQUID MATERIAL
Filed Aug. 21, 1941    7 Sheets-Sheet 7
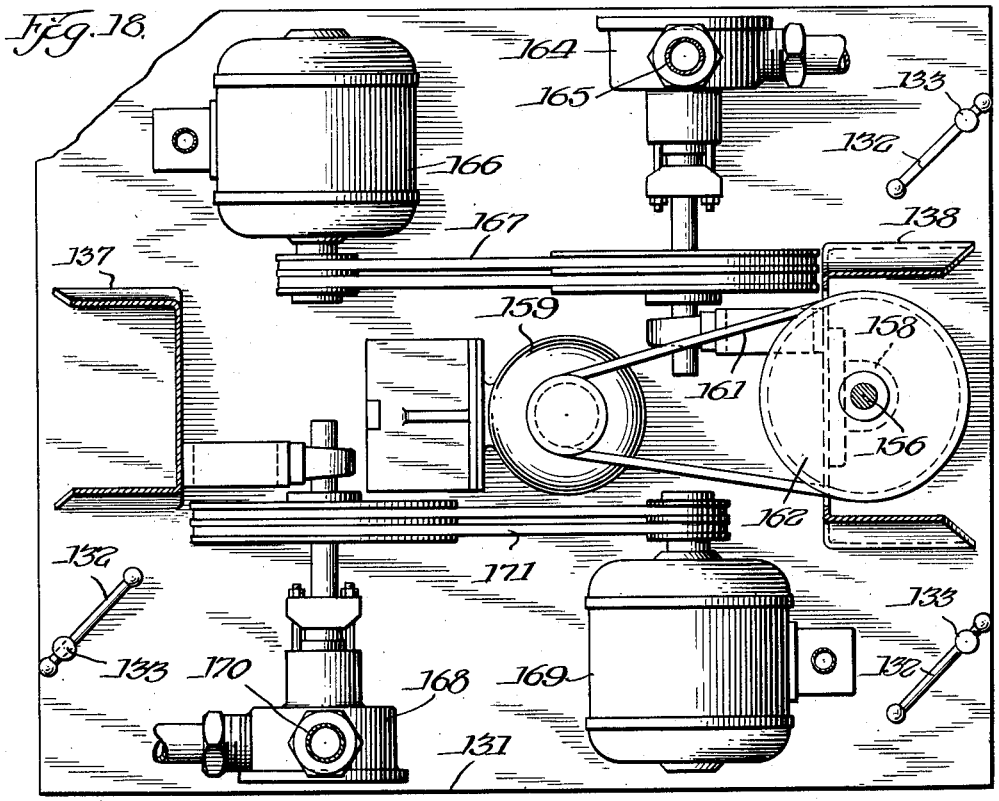
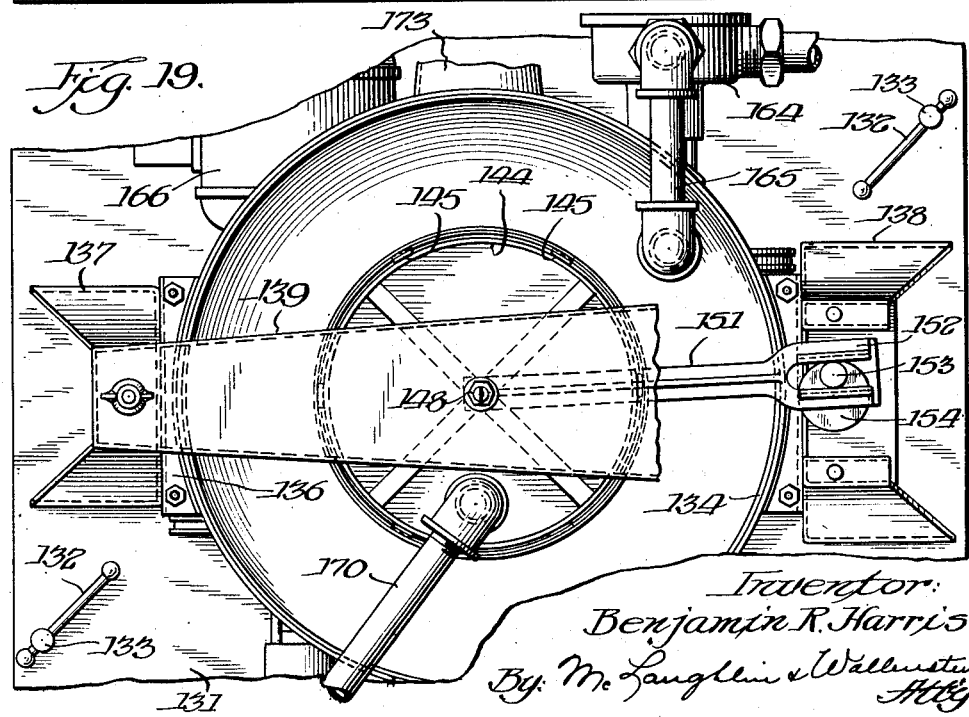
Inventor:
Benjamin R. Harris Patented Jan. 8, 1946

2,392,666

UNITED STATES PATENT OFFICE 2,392,666

FILTERING OF LIQUID MATERIAL

Benjamin R. Harris, Chicago, Ill.

Application August 21, 1941, Serial No. 407,837

9 Claims. (Cl. 210—154)

My invention relates to filtering liquid material and is particularly concerned with a new and useful novel filtering apparatus.

I have evolved a novel apparatus for the filtering and treatment of liquid materials containing solids or semi-solids disposed or suspended therein, the apparatus being highly efficacious for the filtering of various types of liquids, all as is hereinafter described in detail.

In general, my invention is accomplished by providing a suitable straining septum, such as a relatively fine mesh screen, between a body of filtered liquid material and a body of unfiltered liquid material, with provision for inducing flow of the liquid material in the direction of the filtered liquid material while concomitantly imparting relatively rapid movement to the screen, particularly accompanied with a change in the direction of movement thereof. A relation is maintained between the rate at which material tends to enter the interstices of the screen to clog it and the action in releasing or rejecting by the screen particles which would tend to clog it, so that clogging does not occur. This function is facilitated by so constructing and arranging the parts that solid or semi-solid particles rejected by the screen will not again fall back upon the screen and require their repeated rejection by the screen, and a consequent concentration of such materials at the screen surface. Preferably the pressure, such as the hydrostatic pressure, utilized to promote the movement of the liquid material through the screen, is of a low order. The movement of the screen not only results in inhibiting or greatly delaying the clogging action of the fine mesh orifices, but it also permits the use of a finer strainer, or screen, or, assuming there is no change in the mesh of the screen, it results in a much greater volumetric flow than would normally take place without the screen movement. Other features and functions will be pointed out after a description of the preferred embodiment shown.

In the preferred embodiment of the invention, I provide a cylindrical screen body of fine mesh material which is continually subjected to relatively rapid vibrational movement about its axis. The liquid material to be filtered is disposed, in a body, in contact with the screen on one side thereof, preferably the outside, and the filtered liquid material is removed from the other side of the screen, preferably from within the circular area defined by the screen body. By continuously supplying unfiltered liquid material to the outside of the cylindrical screen body and continuously removing filtered liquid material from the inside of the cylindrical screen body while the screen body is being relatively rapidly reciprocated, unusually large capacity is obtained when only a relatively small difference in level is maintained on opposite sides of the screen.

Other objects and features of the invention will be apparent from a consideration of the following detailed description taken with the accompanying drawings, wherein Fig. 1 is an elevational view showing one embodiment of the equipment of my invention as mounted within a common style of stainless steel tank;

Fig. 2 is an irregular plan sectional view taken on the line 2—2 of Fig. 1, looking in the direction of the arrows;

Fig. 3 is an enlarged sectional view taken on the line 3—3 of Fig. 2, showing a feature of the drive utilized for imparting vibration to the screen body;

Fig. 4 is a plan sectional view taken on the line 4—4 of Fig. 3;

Fig. 5 is a fragmentary plan view showing a motor and pump for removing the treated liquid material from within the screen body;

Fig. 6 is an enlarged sectional view showing a detail of a coupling;

Fig. 7 is a sectional view thereof taken on the line 7—7 of Fig. 6;

Fig. 8 is an enlarged sectional view showing the construction of the screen body, which appears in elevation in Fig. 1;

Fig. 9 is a plan sectional view taken on the line 9—9 of Fig. 8, looking in the direction of the arrows, a driving arm shown in Fig. 8 being broken away in order better to show the relationship of the parts;

Fig. 10 is an enlarged sectional view taken on the line 10—10 of Fig. 9, showing certain structural details;

Fig. 11 is a fragmentary sectional view taken on the line 11—11 of Fig. 10;

Fig. 12 shows a modified structure in which the straining device is arranged generally in the form of a so-called line strainer;

Fig. 13 shows another form which the straining element may take;

Fig. 14 illustrates a modified drive;

Fig. 15 shows another form of straining element;

Fig. 16 is an elevational view, partly in section, of a different embodiment of my invention;

Fig. 17 is an elevational view of the same embodiment of Figure 16 but viewed from a different position;

Fig. 18 is a top view, the tank and screen being removed, showing the arrangement of the drives for the embodiment of Figures 16 and 17; and Figure 19 is an enlarged plan view showing the arrangement of the means for oscillating the screen in the embodiment of Figures 16 and 17.

Referring now to the drawings, the numerals 12 and 13 identify tanks, the tank 12 being shown as having a tapered bottom 14, with a drain line 16 in which is inserted a gate valve 17. The tank 13 is shown with a valved drain connection 18 for delivery of liquid material into a container 19. In the arrangement shown in the drawings, the liquid material is delivered through a pipe 21 and conventional coarse strainer 22 into the tank 12. The material introduced into the tank 12 is processed in accordance with the present invention by the equipment as shown and which will now be described, is thence delivered into the tank 13 and from tank 13 it may be withdrawn to be handled in any suitable manner which may include introduction into the container 19.

The tanks 12 and 13 are supported by angle members 23, which, together with cross members, form a frame for the attachment of equipment including a pump 24, motor 26 for operating the same, a motor 27 for imparting vibration to the screen body indicated generally by the reference character 28, and the related operating parts. The liquid material which has passed through the screen is pumped through a pipe 29 to pipe 31 by the pump 24 and thence delivered to the tank 13. For the purpose of making clear the manner in which the screen body 28 is supported and driven, the construction as shown in the drawings and particularly in Figs. 8 to 11, inclusive, will now be described.

A central tubular supporting member 32 has near its upper end radially extending arms 33 which connect to an upper ring 34 forming part of the frame. At its lower end, the tubular supporting member 32 carries radially disposed arms 36 connected to a generally cup-shaped member comprising a ring portion 37 and bottom portion 38. The tubular member 32 and parts integral with it comprise a screen supporting frame for carrying the screen and imparting movement to it as will be described. Centrally of the bottom portion 38 of the frame is a pin or boss 39 journaled in a bearing 41 carried by a frame member 42 disposed within the tank 12. This positions the screen body at the bottom thereof. At the top an angle iron 43 (see Fig. 2) and T-bar 44 connected to the upper rim of the tank 12 and forming a part of the main frame structure together carry a bearing member 46 in which the upper part of the tubular member 32 is journaled. By means of the upper and lower bearings described, the position of the screen body is established within the tank 12, and a support is provided which will permit free oscillatory movement about the axis of the screen body.

A cylindrical screen member 47 is secured at its upper edge to a flanged ring 48 and at its lower edge to a flanged ring 49. The flange on the ring 49 is engageable against the bottom edge of the member 38. The flange on the upper ring 48 extends outwardly to occupy a position beneath a radially extending flange provided on the ring 34. Thus, when the parts occupy the position shown in section in Fig. 8, the bolts 51 extending through apertures in the flange on the ring 34 and threaded into apertures provided on the ring 48, may be screwed up uniformly to apply an even, uniform tension upon the screen 47, thus maintaining the screen in proper position upon its frame.

The screen may be secured to the rings 48 and 49 in any suitable manner. As illustrated in the drawings, I utilize both at top and bottom a band 52 which is wrapped tightly around the edge of the screen extending over the ring in question, and held in place by machine screws 53. Fig. 10 illustrates this construction. By this or other suitable mechanical means, the screen 47 and the rings 48 and 49 are assembled so as to form substantially a single unit. To cause this unit to move with the remaining portion of the screen body, both of the rings 48 and 49 are provided with vertically extending ribs 54 engaging in grooves 56 provided in both the portions 34 and 37 of the supporting frame.

The result of this construction is an assembly wherein the main support is near the axis of rotation, and there is only a relatively very small amount of weight at the extreme outside of the mass which comprises the entire screen assembly. As a consequence, the screen body may be readily oscillated at a high rate of speed by means of a relatively small motor and relatively light weight operating parts, the drive being through the screen supporting frame comprising the ring 34, the tubular supporting frame 32 and the bottom portion 37.

Referring now principally to Figs. 1 to 4, inclusive, the motor 27 is carried on a mounting bracket 61 attached to the main frame, and drives at normal motor speed a driving disk 62. This disk is provided with a plurality of threaded holes 63 bored parallel to the axis of rotation of the driving disk 62 and spaced varying distances from the center. A driving arm 64 is brought into operative relation with the driving disk 62 by extending a cap screw 66 through an opening provided in the end of the arm and threading the cap screw into the desired hole 63. As shown in Fig. 3, a spacer 67 is provided, and the cap screw has a shoulder engaging against the face of the driving disk 62 so that, when the cap screw is tightened into position, the arm 64 will be held firmly but not tightly enough to cause binding. As shown in Fig. 10, the opposite end of arm 64 is attached to the periphery of the ring member 34 by means of a cap screw 68 threaded in a boss 69 formed on the upper surface of the ring member 34. By utilizing the boss 69, it becomes unnecessary to employ a spacer, and the boss also serves to provide adequate metal on the ring 34 at the point where the arm 64 is attached, while permitting the structure generally to be as light as possible consistent with the load carried. By means of the construction described, the amplitude of the oscillatory movement imparted to the screen is readily controlled by merely changing the position at which the arm 64 is attached to the driving disk 62.

The pipe for withdrawal of the filtered liquid material shown at 71 in Fig. 8 is extended through the center of the tubular frame support 32 to permit its being inserted substantially to the bottom of the space defined by the screen without possibility of interference with the free operation thereof. This pipe 71 is connected to a transverse pipe 72 by a suitable L-coupling 73, and to the pipe 29 leading to the intake side of the pump 24. To provide for readily detaching pipes 72 and 29, I utilize a special coupling arrangement as shown in detail in Figs. 6 and 7. Coupling members 74 and 76 are threaded on the adjacent ends of pipes 72 and 29, respectively. The coupling member 74 is provided with a plurality of edge slots, and coupling member 76 is provided with threaded fastening members 77 pivoted at 78 to swing into or out of the edge slots on the coupling member 74. By tightening nuts 79, the coupling members are brought firmly together in face to face contact. The drawings do not indicate the use of a gasket between the members 74 and 76, but it is understood that any usual means of packing or gasketing connections of this type may be employed. It is clear that the pipes 72 and 29 may be disconnected from each other without the requirement of turning either of them, by loosening the nuts 79 and swinging the fastening members 77 away from the coupling member 74. While other types of connecting means may be employed, it will be seen that the coupling disclosed has the advantage of being readily cleaned, an important feature when food and like materials are being handled.

In order to permit the ready removal of the entire screen assembly, the bearing 46 is constructed in two parts, one supported by the frame as shown by bolts 81 and the other pivoted at 82. A cap screw 83 maintains the bearing assembled as appears clear from Fig. 2. By merely removing the cap screw 83, the bearing may be separated, thus freeing the upwardly projecting portion of the tubular frame support 32.

In operating the equipment, the liquid material to be filtered is introduced through the pipe 21 and through the relatively course strainer 22, the tank 12 being filled to a level reaching almost to the top of the screen 47. As introduced into the tank 12, the unfiltered liquid material may contain relatively small portions of coarse or large particle size matter, and such substances are removed by the screen or trap 22.' The remaining portions are removed by movement of the liquid material through the screen 47.

When the liquid material in the tank 12 has reached a sufficient height so that operations can begin, the motor 27 is started, the arm 64 having previously been adjusted to impart the proper vibratory movement to the screen. This movement of the screen facilitates the passage of the liquid material through the meshes of the screen and also has the effect, with many materials, of producing a much more homogeneous and desirable product than is obtainable by forcing such liquid material under pressure through a stationary screen in accordance with prior art practices. The pump 24 is operated to maintain the level of the liquid material within the area defined by the screen sufficiently lower than the level in the tank 12 to cause a suitable flow of liquid material through the meshes of the screen. In actual practice, the hydrostatic head established by the pressure differential need not be particularly great. I have found in actual practice that a difference in level of only a few inches will result in a marked and sufficiently rapid flow of the liquid material through the screen. It should be understood, however, that a difference in level is determined by practical operating conditions such as the liquid material being treated, the exact results desired, and the judgment of the operator. I prefer to maintain a difference in the levels within and outside of the screen of about 2 to 2½ inches. This can be accomplished by observation and manual control or, alternatively, a float arrangement may be provided.

The filtered liquid material is withdrawn continuously from the inside of the screen and delivered to a suitable storage receptacle or other device for further treatment. The use of the tank 13 is purely illustrative.

The apparatus may be operated for a relatively long period of time with little or no clogging of the meshes of the screen. The undesirable portion of the material introduced into the tank 12 gradually settles to the conical bottom portion 14 so that there is no excessive accumulation of matter rejected by the screen in the upper part of the tank 12. When the accumulation of matter rejected by the screen in the lower part of the tank 12 has increased to a point where it may have a deleterious effect upon the operation of the equipment, the valve 17 is opened and the relatively heavy foreign matter and the like is withdrawn.

Figs. 12 to 15, inclusive, illustrate generally the manner of utilizing the modifications discussed generally in the preceding paragraph. Looking first at Fig. 12, I show a cylinder 86 having a top 87 and a bottom 88, which may be attached thereto by means of threads as shown. The screen element comprises a frame structure 89 in the form of cross supporting members carried between top and bottom closure members 91 and 92, respectively, which entirely enclose the ends of the screen. These closure members 91 and 92 and the frame structure 89 comprise together a frame for supporting a filtering element or septum 93, the construction being such that no material can pass from within the cylinder 86 to the portion thereof within the area of the filtering element without passing through the meshes of the screen or other septum which may be employed. The closure member 91 carries an integral upwardly extending projection 94 which extends into a bearing 96 formed integrally as a boss on the top 87. A cap 97 completely closes the opening which would otherwise result at the bearing. At the bottom end, a hollow trunnion 98 is provided integral with the bottom closure member 92, and this hollow trunnion is journaled in a bearing 99 forming a part of the bottom portion 88 of the container which comprises the cylinder 86. At the portion where the hollow trunnion 98 projects below the bearing 99, an arm 101 is secured, this arm being shown as having a link 102 pivotally connected to it for reciprocating the arm 101 and the straining element with it from a suitable source of power. The bearings are shown simply arranged and with no special provision for lubrication, because the present invention does not relate either to lubrication or the manner of construction of bearings. It may be pointed out, however, that some materials which may be filtered will provide their own lubrication and no special form of lubrication of the bearings is required.

In the top 87, I also provide an apertured boss or projection 103 to which a supply pipe 104 may lead. The material to be filtered, therefore, may be introduced through the pipe 104 and caused to fill the entire space between the outer surface of the filtering element and the inner surfaces of the container which comprises the cylinder 86. Solid or semi-solid matter may be allowed to accumulate in the bottom of the container, or it may be periodically or continuously withdrawn through a valved drain line 106.

In operating the device shown in Fig. 12, the straining element may be entirely immersed in the liquid to be filtered and, if desired, the material may be fed in at the supply pipe 104 under some pressure. The system may, on the other hand, be left open to atmosphere, and the quantity of liquid to be filtered may be limited in order to maintain a level approximately at the upper limits defined by the screen or other septum used. Should the liquid to be filtered be delivered to the inside of the cylinder 86 under pressure, then it is essential that the forces resulting from the movement of the screen and resulting in the "shaking off" of solid or semi-solid particles be adequate to overcome at least in part the force of the particles moving toward the screen, otherwise stoppages will occur because of clogging. While these stoppages may not be as frequent as if the screen is allowed to remain stationary, as in the usual practice with line strainers of this type used, for example, in the egg industry, I consider it desirable to prolong as much as possible the operating periods between stoppages. The preferred arrangement obviously is to balance the operation in such a way that, during the normal period where liquid material is being filtered, the screen may be used continuously without shutting down for cleaning. If the operation of the screen may be controlled, as it can in accordance with the present invention, so that any cleaning which may be necessary can take place at a time when a filtering operation is not normally being carried out, for example at the end of a day's run, then a considerable advantage in economy results.

The construction and assembly of the form of device shown in Fig. 12 in general is clear from the drawings. It may be pointed out, however, that the arm 101 is readily removed from the hollow trunnion 98, and the top 87 is readily removed from the cylinder 86. The entire filter assembly may now be lifted out without difficulty. It will also be noted that, if the filter is to be employed on materials which do not contain large proportions of solid or semi-solid material which will be rejected by the screen, the valved drain line 106 may be eliminated and the material rejected by the screen may be withdrawn through the bearing 99 when the filter element is lifted. Due to the ease with which the filter element may be removed, it may at times be desirable, in order to increase capacity in a given piece of equipment, to increase the force at which the material is delivered to the screen, knowing that the screen will be clogged at an earlier time than if the force employed were not so great. Under these circumstances, it takes only a few minutes to remove the screen element and insert another one, thereby permitting the operation to continue without an appreciable loss of time. In general, however, I prefer so to construct the apparatus that the equipment may be operated at least for the period of a normal day's run without having to shut down for cleaning purposes.

In Fig. 13, I show a filter or strainer 107, having top and bottom bearing members 108 and 109, respectively. The filter or strainer 107 is shown in the form of a cone. The device, as shown in Fig. 13, may be assembled within an outer container and may have movement imparted to it, such as described in connection with the other embodiments, so that solid or semi-solid matter will be rejected by the screen. It will be noted that as any of these particles tend to fall by gravity, they fall away from the screen and the number of times in which a given particle must be rejected by the screen is considerably decreased as compared to the situation when a cylindrical screen is used. Fig. 13 illustrates, therefore, that other forms of screens may be used to advantage and it will be understood that, in addition to cylinders or cones, the screens may have the shape of hemispheres, parallelopipeds and the like, or, depending upon the design, still other forms which lend themselves to movement in accordance with my present invention.

Fig. 14 is a more or less schematic view illustrating a modified manner of moving a straining element in a pulsating or reciprocating manner. Here I show a solenoid 116 to which a direct current line, illustrated by the conductors 117 and 118, is connected. A plunger type of armature 119 is pivotally fastened at 121 to an arm 122, which is in turn pivotally connected to a strainer element 123. A switch 124, inserted in that portion of the line comprising the conductor 117, is adapted to be opened by a projection 126 carried by the plunger 119 when the solenoid is energized and the plunger type of armature enters the solenoid. A spring 127 tends to move the armature in the opposite direction, and, on the breaking of the circuit by opening the switch 124, the spring comes into action and reverses the movement. The switch 124, being of a self-returning type, will again close the circuit when the projection 126 has been withdrawn. For simplicity, the arrangement is rather schematically shown, but it illustrates that, through electromagnetic means properly designed in accordance with the load involved, the straining element may be driven at a relatively high rate of speed. Fig. 14, therefore, is illustrative of only one form of modification which may take place in the driving mechanism. It will be understood that the design of the driving mechanism as well as the design of the entire apparatus should take into consideration the liquid material being treated and the functions required in that treatment. The balance of forces involved, the solid or semi-solid particles on the one hand tending to enter the meshes of the screen, and on the other hand tending to be driven away from the screen, is of prime importance so far as design is concerned.

Fig. 15 shows another form of cylindrical screen 111 provided with a plurality of narrow slots 112. A ring 113, secured in any suitable manner such as by brazing, welding, or soldering to the top of the cylinder 111, carries an arm 114 through which movement may be imparted to the cylinder as a whole. The figure does not illustrate the manner of mounting a cylinder of this character, it being understood that any usual form of mounting means, such for example as shown in preceding embodiments, may be employed. I desire to point out, however, that a solid cylinder, provided with slits such as shown in Fig. 15, may comprise its own frame structure, thereby securing adequate strength and lightness, whereby there is less work involved in driving the screen in the manner contemplated by the present invention at an extremely high rate of speed. It will be understood that the form of the openings in the cylinder may vary. Where slits are employed, and assuming a cylinder about six inches in diameter and fifteen inches deep, these slits are preferably two to fourteen inches in length and one sixty-fourth of an inch wide, or narrower, depending upon the material to be filtered. These are merely illustrative figures for the guidance of those skilled in the art.

Figures 16, 17, 18 and 19 show a different embodiment of my invention which, although operating in accordance with the principles and teachings which I have set out hereinabove, is particularly satisfactory.

The entire assembly is mounted on a wheeled base 131 which may be kept in a fixed position upon the floor in any desired location by any suitable means. In the embodiment of Figures 16, 17, 18 and 19, I have disclosed an arrangement comprising spaced members 132 and cooperating threaded leg portions 133 which are adapted to be wedged against the floor.

The tank 134 is supported on angle members 136 attached to opposite frames 137 and 138 mounted on the base 131. Spanning the space between the frames 137 and 138 is a plate 139 which serves to carry a bearing support, as hereinafter pointed out, and which is locked to the frames by means of cooperating threaded bolts 141 and wing nuts 142 to provide a rigid structure. Interiorly of the tank 134 and concentrically disposed therein is the cylindrical screen 143 mounted for oscillatory movement. The screen may be supported on a frame as described in connection with Figure 8 or, alternatively, it may be brazed onto the frame. Spiders 144 and vertical ribs 145 are employed to lend strength and rigidity. The screen and frame, or the screen assembly, is fixed to a hollow tubular supporting member 146 to which the spiders 144 are attached. The upper portion of the member 146 is supported for oscillatory movement in a bearing 147 carried by the cover 130 by means of the bolt and nut assembly 148. The lower portion of the member 146 is supported for oscillatory movement of the member 149.

Affixed to the member 146 is an arm 151 provided at its outer end with a yoke portion 152 disposed within which is the eccentric or off-set pin 153 mounted on the disk 154. The disk 154 is adapted to be rotated through the vertical shaft 156 supported in bearings 157, 158 mounted on the frame 138. A motor 159 driving through a belt 161 and sheave 162 serves to rotate the shaft 156 and thereby to impart oscillatory movement to the arm 151 and, in turn, the screen 143.

Mounted on the base 131 are two pumps, one for pumping the liquid to be filtered into the tank 134 and the other for withdrawing the filtered material from within the cylindrical screen 143. The pumps are of the positive-acting type, the so-called "Viking" pump being especially satisfactory. The pump 164, driven by the motor 166 through the belt 167, serves to pump the material to be filtered into the tank 134 through pipe 165, and the pump 168, driven by the motor 169 through the belt 171, serves to withdraw the filtered material from within the cylindrical screen 143 through pipe 170. The tank 134 is provided at its bottom with a valved pipe 172 for periodically withdrawing accumulations and the like which settle out during operation, and at its top portion there is an overflow pipe 173.

The operation of the equipment of Figures 16, 17, 18 and 19 is apparent in the light of the explanations and disclosure set out hereinabove.

It will be understood that the fineness of the screen should be determined by practical operating conditions and the type of liquid material being treated. I have found that a screen having fifty meshes to the inch, that is, having fifty wires per linear inch running in each direction, may be used suitably when the liquid material being processed comprises a product such as liquid egg yolk or the like. The mesh size may be varied within wide limits, depending in part on the material being treated and the exact character of the results desired.

From the standpoint of the character and the operation of the equipment, it is greatly preferred that the movement be an oscillatory one about the axis of the screen. In actual operation, I have found that when about 5 to 10 oscillations per second are imparted to the screen, very good results are obtained when the movement of the screen is through an arc of somewhat less than five degrees. The periodicity and amplitude of movement, however, may be varied substantially without impairing the results obtained.

Using equipment of the character shown and operated in the manner described, the liquid material, such as egg yolks or the like, flows through the screen substantially as rapidly as delivered to the tank 12 and is withdrawn by the pump 24 when there is only a slight difference in level between the liquid material on the two sides of the screen. When under the same conditions, however, the screen is allowed to remain stationary, I find that only a small amount of the liquid material will flow through the screen before it is completely clogged. More particularly, in a cylindrical device constructed of 50 mesh metal gauze 8 inches in diameter and 18 inches deep, with a solid metal bottom, treating, in accordance with my present invention, a yolk-egg white-common salt mixture containing 10% salt and having an over-all solids content of 41%, under a hydrostatic head of one inch, 500 pounds were filtered in 20 minutes, and the screen at that time was in such condition that operation could have been continued for a great deal longer period without appreciable loss of capacity due to clogging. Using the same device, but in a stationary condition, and on egg material of identical composition, only 100 pounds could be passed through in 20 minutes; and, what is even more significant, the effectiveness of the device was impaired to such an extent that the operation had to be interrupted in order to clean out the material which had impacted the openings of the metal gauze.

The manner of assembling the equipment should be clear from the description thereof. I wish to point out, however, that all of the parts are readily removed for cleaning. If it is desired to replace the screen, the entire screen assembly is readily removed, after which the bolts 51 may be withdrawn and another screen 47 secured in place. In mounting the screen in position, it is only essential that enough tautness be maintained so that the screen will retain its cylindrical character when inserted into the body of liquid material in the tank. Due to the fact that only a slight difference in level of the liquid material on the two sides of the screen is preferably maintained, there is very little pressure on the screen because of the filtering action. Since the supporting weight is distributed substantially along the center line about which the movement occurs, the rapid vibrational movement does not result in placing an undue strain on the parts.

Those skilled in the art will readily understand that modifications in structure of the equipment and in operating technique may be made without departing from the teachings of the invention. For example, the screen may be an ordinary gauze, or cloth of suitable mesh or other suitable filter or screen material such as those formed of metal, textiles, spun glass and the like. Perforated metal may be used under suitable circumstances.

The movement of the screen has the effect of "shaking off" those particles which would normally enter the interstices or meshes of the screen and cause clogging. This "shaking off" action is apparently due to the fact that the screen, in moving, engages the particles in suspension and forces them out of the path which they would normally follow to enter the meshes of the screen. In other words, the force driving the particles away from the screen is greater than the force, such as a hydraulic head, which moves the particles toward the meshes of the screen. The movement of the screen should therefore be such that the liquid to be filtered is permitted to remain in such contact with the screen as to freely flow through the screen. The forces involved are altered as the movement of the screen is changed, but such forces may more than overbalance the forces tending to deliver the solid particles to the meshes of the screen and cause clogging. The action of the screen is illustrated by the results which occur if air in the form of small bubbles is entrapped in the liquid material, for example, egg material. These bubbles adhere to the side walls of the screen and function very much like solid matter against a stationary screen, and cause clogging. The bubbles, having very little mass, apparently are not "shaken off," thus further indicating that there is a positive force involved which rejects the relatively heavy solid or semi-solid matter, but allows the normal liquid to pass the screen. For the reason explained, it is preferred that appreciable volumes of air be excluded from liquid material during the filtering or processing thereof, according to the present invention.

I wish to point out that the capacity of a filter employed in accordance with my invention is very greatly increased over the capacity of a filter of the same size and mesh when used in accordance with prior art practices. The force directing the material through the filter may be increased to increase capacity, but should not be sufficiently high to affect the function of the screen movement and cause clogging. Capacity may be increased in a given installation, therefore, by increasing the speed of movement of the screen to affect the increased flow of material, or by increasing the area of the screen, leaving other factors constant. It is plain that in starting and stopping a filtering operation, the factors involved are not identical with those during normal operation. For example, when liquid material is first introduced into the tank 12, there is no material within the area defined by the screen body. If the rise of liquid in the tank is gradual, it is simply necessary to set the screen in motion and withdraw no filtered material from within the screen until the height in the tank 12 has reached approximately the normal operating level.

I have already referred to the fact that the structure of the equipment may be altered. For one thing, the character of the screen may vary. All other factors being equal, I may employ a much finer mesh screen than can be successfully employed if it remains stationary. The screen should preferably be so arranged that solid matter in suspension rejected by the screen will not tend to fall back on the screen. The screen surface, therefore, is preferably generally vertical, or, if horizontal, the flow should be from below.

I have not attempted to describe in any detail the forces involved in the action of the moving screen in "shedding" or "rejecting" solid or semi-solid material. There may be several causes for movement of the solid or semi-solid particles away from the screen, the simple matter of striking the solid particle and driving it away not being insignificant so far as the forces involved are concerned. The action of the screen in rejecting solid or semi-solid particles is not effective, however, against liquid or liquid-like components of the material being processed, since the liquid material is apparently always maintained in contact with the screen so that it has a smooth, easy flow through the meshes or interstices of the screen, filter or other septum used. I have found that particles which are apparently small enough to pass through the meshes of the screen are nevertheless rejected by the screen. This action of rejecting particles apparently finer than the meshes of the screen is the opposite of the experience found with what might be called static filters as contrasted with dynamic filters wherein, because of the high pressures which are used, particles apparently larger than the meshes of the screen are forced through.

This ability to remove by filtration very small solid or semi-solid particles has a very definite function and advantage when operating on liquid materials such as egg material. In the normal egg, there is a fine hair-like membranous connection between the yolk and white, a protein-like material which is not effectively removable from liquid egg material by any other straining method with which I am familiar. When liquid egg material is treated with salt, the objection to these thread-like particles is increased. On standing, these particles tend to settle, and sometimes are plainly visible in parts of a batch of material, thus deleteriously affecting the homogeneity and appearance of at least part of a batch of salt-treated egg material. The practice of my invention decreases greatly or entirely eliminates these thread-like particles and other solid or semi-solid substances of the same general size which prior filtering methods will not remove.

While my invention is especially useful in connection with the processing and filtering of liquid egg material, the invention may be practiced in connection with filtering or treating other types of materials which are not readily filtered by the use of equipment which has been available heretofore. Examples are biological materials of aqueous character such as effluents containing suspended or dispersed colloidal or semi-colloidal matter which has a tendency to clog porous septa. In the case of egg material, the action is not only to filter such material, but to bring it to such a homogeneous condition that improved results are obtained when such egg material is subsequently frozen, dried or otherwise treated.

Previously, in this specification, I pointed out that the term "screen" was not used in a limiting sense except when the context so indicated. This statment obviously applies to the appended claims, which should be interpreted in the light of the specification.

The present application is a continuation-in-part of my prior application Serial No. 339,253, filed June 7, 1940, now Patent No. 2,346,682, issued April 18, 1944.

What I claim as new and desire to protect by Letters Patent of the United States is:

1. Apparatus of the character described for filtering liquid material and the like, comprising an outer container for holding the liquid to be filtered, a cylindrical screen, disposed within said outer container and spaced therefrom so that substantially all of the exterior peripheral surface of the screen is exposed to direct contact with the liquid to be filtered up to the level of said liquid, the cylindrical wall of said screen being provided with meshes forming filter openings, means for oscillating said screen rapidly about its major axis, means for maintaining a body of the material to be filtered in direct contact with and on one side of the screen, means for maintaining a body of filtered liquid material on the other side of said screen and in direct contact therewith, means for maintaining a pressure differential between the liquids on the opposite sides of said screen whereby to cause the said material to pass through said screen, and means for removing the filtered material which has passed through the screen.

2. Apparatus of the character described, comprising an outer container for holding liquid to be filtered, a screen body including a frame, a cylindrical screen carried by the frame, said cylindrical screen being disposed within said outer container and spaced therefrom so that substantially all of the exterior peripheral surface of the screen is exposed to direct contact with the liquid to be filtered up to the level of said liquid, the cylindrical wall of said screen being provided with meshes forming filter openings, an axial support for said screen body, means for rapidly oscillating said screen about its major axis, means for maintaining a body of material to be filtered around and in contact with said screen body, and means for withdrawing filtered material from within said screen body, means for maintaining the height of material outside the screen at a level above the level within the screen body, whereby liquid material readily flows through said screen body and material of a solid or semi-solid character incapable of passing said screen is rejected thereby.

3. Apparatus of the character described for filtering liquid material and the like, which comprises an outer container for material to be filtered, a screen body comprising a frame and a cylindrical screen carried by the frame on a vertical axis, said screen being disposed within said outer container and spaced therefrom so that substantially all of the exterior peripheral surface of the screen is exposed to direct contact with the liquid to be filtered up to the level of said liquid, the cylindrical wall of said screen being provided with meshes forming filter openings, the parts being so constructed and arranged that material passing into the space encompassed by screen body must pass through the meshes of said screen, means for maintaining bodies of unfiltered and filtered liquid material, respectively, within said container and on opposite sides of said screen, means for maintaining said bodies of liquid materials at different levels whereby to produce a pressure differential therebetween, means for movably supporting said screen body within said container whereby to place liquid material within said container in contact with the said screen, means for imparting rapid oscillating movement to the screen, and means for withdrawing filtered material from the space encompassed by the screen body.

4. Apparatus of the character described for filtering liquid material and the like, which comprises an outer container for material to be filtered, a screen body disposed in the container and spaced therefrom so that substantially all of the exterior surface of the screen is exposed to direct contact with the liquid to be filtered up to the level of said liquid, said screen body comprising a frame having axial pivots and a cylindrical screen carried by the frame, means cooperating with said axial pivots for supporting the screen body in a vertical position within the container, with its top above the maximum level which liquid will reach within the container, an upper portion of the screen body being open and the remaining portion being closed except for the meshes within the screen, means for maintaining the liquid to be filtered at a level above the level of the filtered liquid on opposite sides of the surface of the screen whereby to produce a pressure differential therebetween, means for imparting rapid oscillation to the screen body about its axis whereby liquid material within the container will pass through the meshes of the screen but solid or semi-solid material will be rejected by the screen, and means for controllably withdrawing filtered material from within the screen, whereby liquid material may be forced through the screen and the rate thereof may be controlled.

5. Apparatus of the character described for filtering liquid material and the like, which comprises an outer container for material to be filtered, a screen body disposed in the container and spaced therefrom so that substantially all of the exterior surface is exposed to direct contact with the liquid to be filtered up to the level of said liquid, said screen body comprising a frame having axial pivots and a cylindrical screen carried by the frame, said frame comprising a tube having a much smaller radius than the cylindrical screen, a plurality of ring members against which the cylindrical screen engages, spider-like connections between said ring members and tube, means cooperating with said axial pivots for supporting the screen body in a vertical position within the container, with its top above the maximum level which liquid will reach within the contaner, an upper portion of the screen body being open and the remaining portion being closed except for the meshes within the screen, means for imparting rapid oscillation to the screen body about its axis whereby liquid material within the container will pass through the meshes of the screen but solid or semi-solid material will be rejected by the screen, and means for controllably withdrawing filtered material from within the screen, whereby liquid material may be forced through the screen and the rate thereof may be controlled.

6. Apparatus of the character described for filtering liquid material and the like, which comprises an outer container for material to be filtered, a screen body disposed in the container and spaced therefrom so that substantially all of the exterior surface of the screen is exposed to direct contact with the liquid to be filtered up to the level of said liquid, said screen body comprising a frame having axial pivots and a cylindrical screen carried by the frame, said frame comprising a tube having a much smaller radius than the cylindrical screen, a plurality of ring members against which the cylindrical screen engages, spider-like connections between said ring members and tube, means cooperating with said axial pivots for supporting the screen body in a vertical position within the container, with its top above the maximum level which liquid will reach within the container, an upper portion of the screen body being open and the remaining portion being closed except for the meshes within the screen, means for imparting rapid oscillation to the screen body about its axis whereby liquid material within the container will pass through the meshes of the screen but solid or semi-solid material will be rejected by the screen, and means for controllably withdrawing filtered material from within the screen, whereby liquid material may be forced through the screen and the rate thereof may be controlled, said means for withdrawing filtered material comprising a pump and pipe, one end of the pipe being connected to the suction side of said pump and the other side extending vertically through said tube forming a part of the frame of the screen body.

7. Apparatus of the character described for filtering liquid material and the like, which comprises an outer container for material to be filtered, a cylindrical, fine mesh screen body disposed in the container and spaced therefrom so that substantially all of the exterior surface of the screen is exposed to direct contact with the liquid to be filtered up to the level of said liquid, said screen body being supported in a vertical position within the container, said bodies of liquid material being maintained in contact with said series, means for maintaining the liquid to be filtered at a level above the level of the filtered liquid on opposite sides of the screen whereby to produce a pressure differential therebetween, means for imparting rapid oscillatory movement to the screen body about its vertical axis whereby liquid material within the container will pass through the meshes of the screen but solid or semi-solid material will be rejected by the screen, means for maintaining a body of unfiltered liquid material in said container at a predetermined level, means for maintaining a body of filtered material within the cylindrical screen at a predetermined level which is not higher than the level of the unfiltered material in the container, and means for controllably withdrawing filtered material from within the cylindrical screen at such a rate that the level relationship of the unfiltered and filtered material is substantially unaltered.

8. Apparatus as defined in claim 7 wherein said means for withdrawing filtered material comprises a positive-acting pump and pipe, one end of the pipe being connected to the suction side of said pump and the other side extending into said cylindrical screen body.

9. Apparatus of the character described for filtering liquid material which comprises an outer container for material to be filtered, a screen body comprising a frame and a cylindrical screen carried by the frame, said cylindrical screen being disposed within said outer container and spaced therefrom so that substantially all of the exterior peripheral surface of the screen is exposed to direct contact with the liquid to be filtered up to the level of said liquid, the cylindrical wall of said screen being provided with meshes forming filter openings, means for movably supporting said screen body vertically within said container whereby liquid material within said container is in direct contact with the said screen, means for maintaining a pressure differential between the liquids on the opposite sides of said screen, means for imparting rapid oscillatory movement to the screen, and means for withdrawing filtered material from the space encompassed by the screen body.

BENJAMIN R. HARRIS.